(12) United States Patent
Balasubramanian et al.

(10) Patent No.: US 10,523,769 B2
(45) Date of Patent: Dec. 31, 2019

(54) FACILITATION OF COMMUNICATIONS TO ANOTHER PARTY USING COGNITIVE TECHNIQUES

(71) Applicant: INTERNATIONAL BUSINESS MACHINES CORPORATION, Armonk, NY (US)

(72) Inventors: Swaminathan Balasubramanian, Troy, MI (US); Radha M. De, Howrah (IN); Ashley D. Delport, Durban (ZA); Indrajit Poddar, Sewickley, PA (US); Cheranellore Vasudevan, Bastrop, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 606 days.

(21) Appl. No.: 15/244,358

(22) Filed: Aug. 23, 2016

(65) Prior Publication Data
US 2018/0063262 A1    Mar. 1, 2018

(51) Int. Cl.
*H04L 29/08* (2006.01)
*H04L 12/58* (2006.01)
*G06F 17/27* (2006.01)

(52) U.S. Cl.
CPC ............ *H04L 67/22* (2013.01); *G06F 17/274* (2013.01); *G06F 17/2785* (2013.01); *H04L 51/12* (2013.01); *H04L 51/32* (2013.01)

(58) Field of Classification Search
CPC ......... H04L 67/22; H04L 51/12; H04L 51/32; G06F 17/2785; G06F 17/274
USPC ........................................................ 709/206
See application file for complete search history.

(56) References Cited

U.S. PATENT DOCUMENTS

| | | | |
|---|---|---|---|
| 8,805,996 B1 | 8/2014 | Gauvin | |
| 2006/0053490 A1* | 3/2006 | Herz | H04L 63/1441 726/23 |
| 2012/0136866 A1 | 5/2012 | Carter et al. | |
| 2013/0282841 A1* | 10/2013 | Bates | H04L 51/32 709/206 |
| 2013/0340089 A1 | 12/2013 | Steinberg et al. | |
| 2016/0065519 A1* | 3/2016 | Waltermann | H04L 51/16 709/206 |
| 2017/0093787 A1* | 3/2017 | Harihara Iyer | H04L 51/12 |
| 2017/0099592 A1* | 4/2017 | Loeb | H04L 67/303 |

FOREIGN PATENT DOCUMENTS

WO    2015006797 A1    1/2015

* cited by examiner

*Primary Examiner* — Chris Parry
*Assistant Examiner* — Weiwei Y Stiltner
(74) *Attorney, Agent, or Firm* — Griffiths & Seaton PLLC

(57) ABSTRACT

Embodiments for facilitating communications of a user by a processor. An appropriateness of the communications is cognitively interpreted based on a plurality of identified contextual factors prior to the user sending the communications to another party. The user is alerted to a possible negative impact of sending the communications to the other party if the interpreted appropriateness is less than a predetermined threshold.

15 Claims, 6 Drawing Sheets

FACILITATION OF COMMUNICATIONS TO ANOTHER PARTY USING COGNITIVE TECHNIQUES

BACKGROUND OF THE INVENTION

Field of the Invention

The present invention relates in general to computing systems, and more particularly to, various embodiments for facilitating communications between a user and another party by a processor.

Description of the Related Art

In today's society, consumers, businesspersons, educators, and others communicate over a wide variety of mediums in real time, across great distances, and many times without boundaries or borders. The advent of computers and networking technologies have made possible the intercommunication of people from one side of the world to the other. Smartphones and other sophisticated devices that rest in the palm of a person's hand allow for the sharing of information between users in an increasingly user friendly and simple manner. The increasing complexity of society, coupled with the evolution of technology continue to engender the sharing of a vast amount of information between people. For example, social media applications allow users to reach a large number of other persons, on a worldwide basis, that once was reserved for mass printed publications such as newspapers.

SUMMARY OF THE INVENTION

Various embodiments for facilitating communications of a user by a processor, are provided. In one embodiment, by way of example only, a method for facilitating communications of a user, again by a processor, is provided. An appropriateness of the communications is cognitively interpreted based on a plurality of identified contextual factors prior to the user sending the communications to another party. The user is alerted to a possible negative impact of sending the communications to the other party if the interpreted appropriateness is less than a predetermined threshold.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
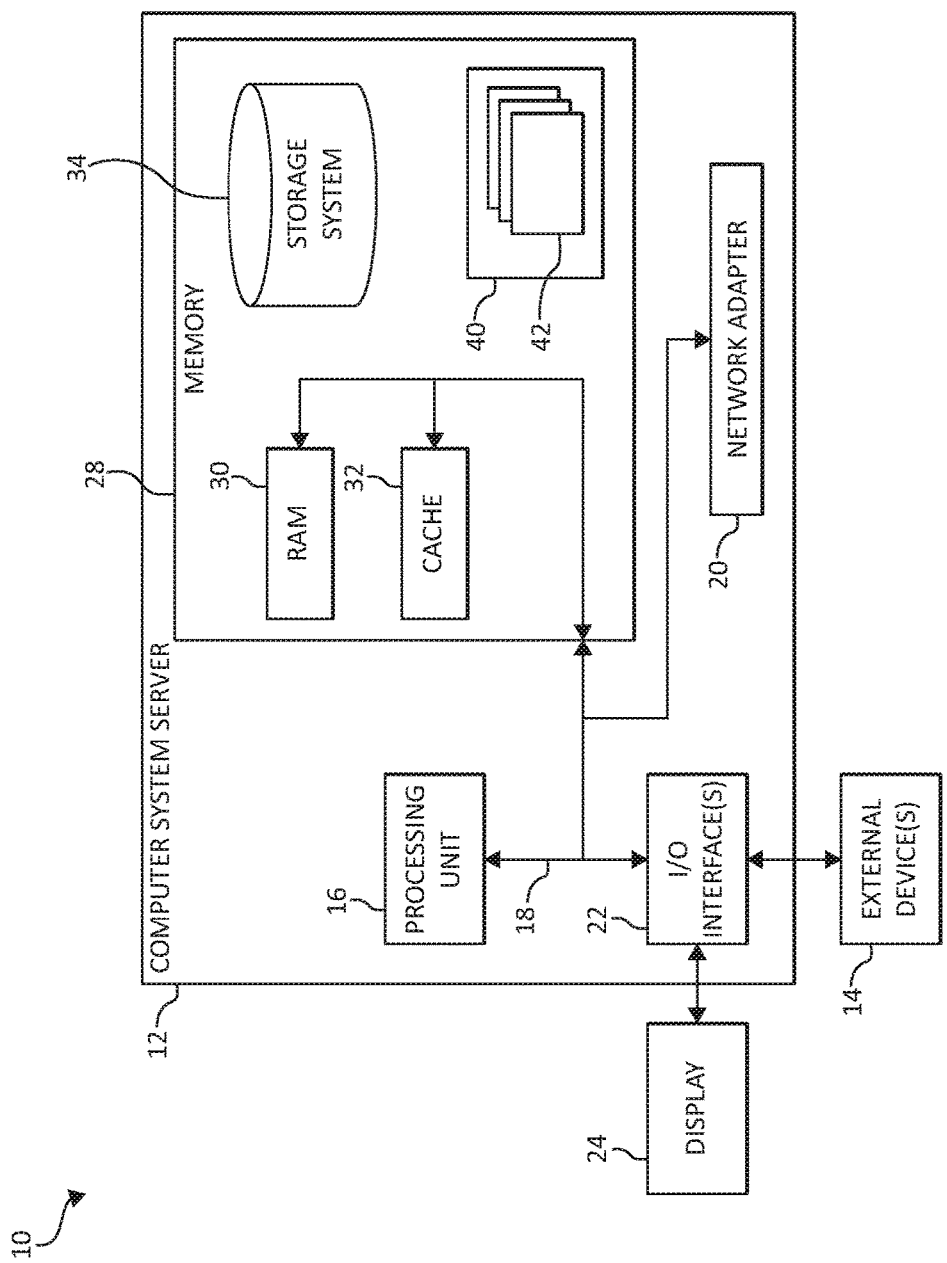
FIG. 1 is a block diagram depicting an exemplary cloud computing node according to an embodiment of the present invention.

With the advent of immediate, real-time communication made possible by smartphones and other devices, along with the proliferation of social media applications and other mechanisms for people to share communication. Communications, such as emails, messages, speeches, social media posts, and other content may immediately become available in the public domain, and may remain in the public domain potentially indefinitely.

For content contributors, for example, the benefits of participating in social media have gone beyond simply social sharing, to building a person's reputation online, and bringing in career opportunities and monetary income. With the foregoing in mind, a user sharing communications, such as over social media, must consider the context of their communications and the implications of these communications. Along with the increased amount of, and ease of, communication has come negative implications in some scenarios, as individuals have lost jobs, others have faced defamation litigation, brands have dropped endorsements of celebrities due to public statements, messages, speeches, or posts, and other implications for sharing communications that were later interpreted as inappropriate.

While some applications, such as social media platforms, may contain functionality that performs a censorship role to eliminate offensive content in some situations, these mechanisms generally strictly use keywords to identify inappropriate communication, for example. However, the use of keywords and other simplistic approaches does not examine the context that the communications are provided. The "undesirable messages" are defined with a common yard stick, in the sense that the communications are interpreted in the same way, irrespective of who says what to whom and/or in what background. In some cases, well-worded communication may be considered proper, irrespective of who says what about what. The conventional approach, then, does not take into account the context of the instant communication.

The so-called "appropriateness" of communication, such as a message, may be very subjective and context dependent. The same message may be interpreted and evaluated to be either fine, or "totally improper," or even "illegal" depending on who (subject) says to whom (object), when and where (context). In some cases, lack of cultural and/or legal knowledge, or even insufficient linguistic and/or worldly knowledge on the part of the person authoring and/or sending communication may cause irreparable damage.

Consider the following example. A comment by an employee about his low opinion of a competing company's product may be appropriate in a private setting between the employee and another employee, such as in a private series of conversations posted inside the company's intranet. However, the same comments about the competitor may be deemed to be disparaging, and perhaps inappropriate, when publicly posted in a social media setting.

The foregoing example illustrates that the content of communication itself may not be inappropriate; rather the context of the communication becomes important as questions of to whom the communication is directed, who the communication is from, who may view the communication, where the communication is sent, and when the communication is sent.

It may be acceptable to post, for example, caricatures of a political figure in one country, but in another country, such caricatures may be a criminal offense. Politically sensitive communications may be acceptable in a personal social media page or through personal emails, but may be inappropriate if shared through company forums, conference calls, emails, or using other corporate resources.

Accordingly, the so-called "appropriateness" of a particular communication may depend greatly upon contextual factors, such as a subject-object relationship, and other contextual factors such as visibility of the message to other audiences/groups of people and current socially sensitive topics. A deeper, cognitive analysis of the communication is needed, for example based on standards, rules, and practices in ethical, moral, as well as legal dimensions.

The mechanisms of the illustrated embodiments help to facilitate communications in situations where certain communication may be inappropriate by employing a cognitive analysis using the context of the communication, in addition to other variables such as country specific laws, a rules system that may be adjusted towards attitude, emotion, machine learning/scoring rules, type of social network (public/private), the social reach/influence of the parties involved, topic of conversation, impact/potential viral spread of a post across social networks, and the like. When one or more of these contextual factors is determined to exceed a predetermined threshold of concern, the mechanisms then may alert the user should there be a potentially negative impact/implication to them. In addition, the mechanisms of the illustrated embodiments may also monitor reaction to communications so that weighting of contextual factors, derivation of certain rules, or other calculations may be tailored by the observed feedback.

It should be noted that reference to calculating an "interpreted appropriateness" against a predetermined threshold herein following may refer to implementations of a wide variety of metric analysis, data analytics, and other data processing as one of ordinary skill in the art will appreciate. For example, a predetermined threshold may be set as a numerical value, where certain kinds of communication are given certain weighted values, and an aggregate number of the weighted values is compared against the numerical threshold value. In other embodiments, a "most significant" aspect of the communication may be selected, given a weight or other metric value, and compared against a bar metric representative of the threshold.

In one embodiment, for example, communications may be organized into certain intensity levels, where a benign form of communication is assigned a lower intensity value, where potentially offensive, illegal, or other generally hazardous communication assigned a high intensity value. Here again, the communications may be examined in view of the context in which the communication is made, so that some communication may be assigned a higher intensity value in a certain context. One of ordinary skill in the art, however, will appreciate that any number of metrics may be implemented as a "threshold" comparison to accomplish the various aspects of the illustrated embodiments.

Other examples of various aspects of the illustrated embodiments, and corresponding benefits, will be described further herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
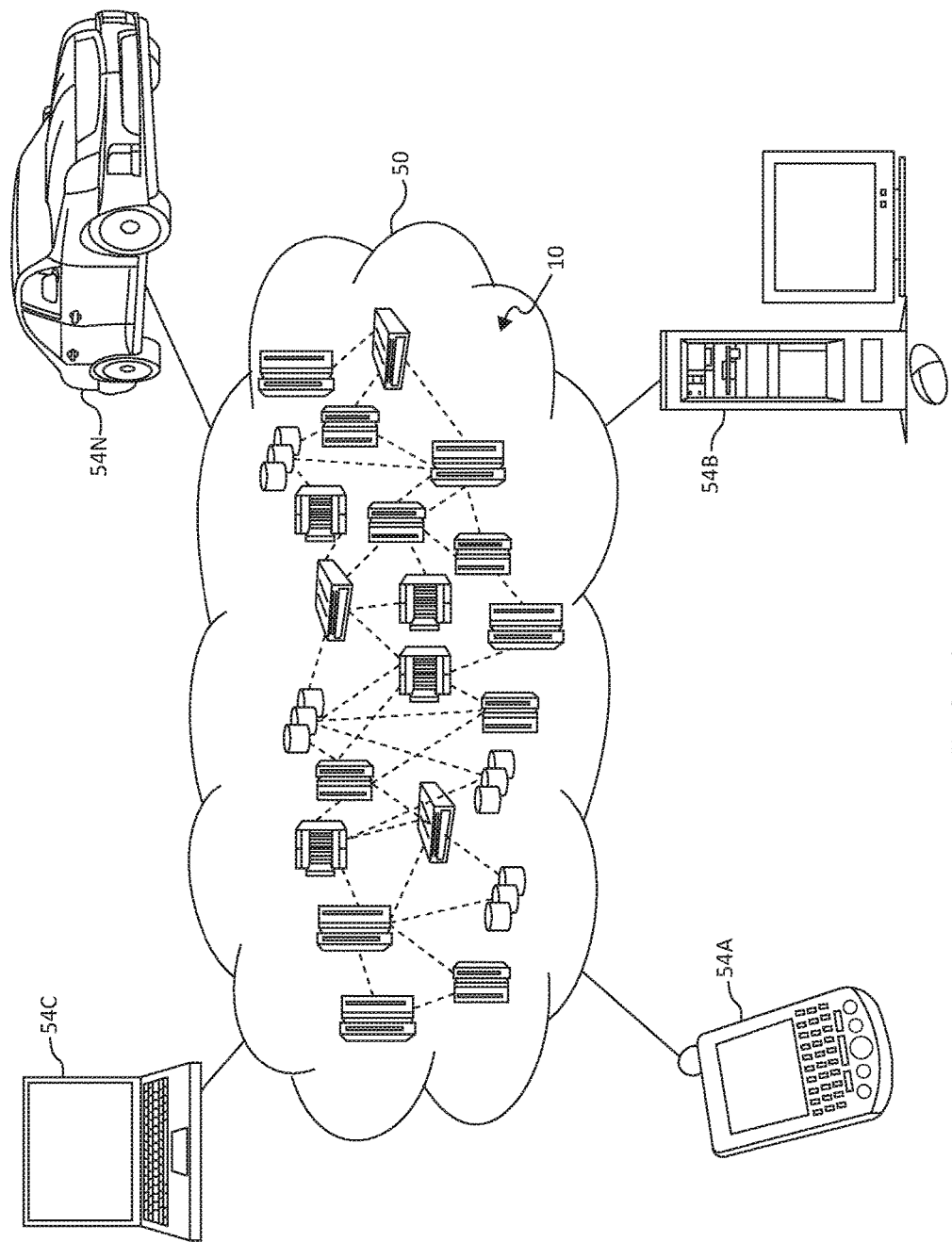
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
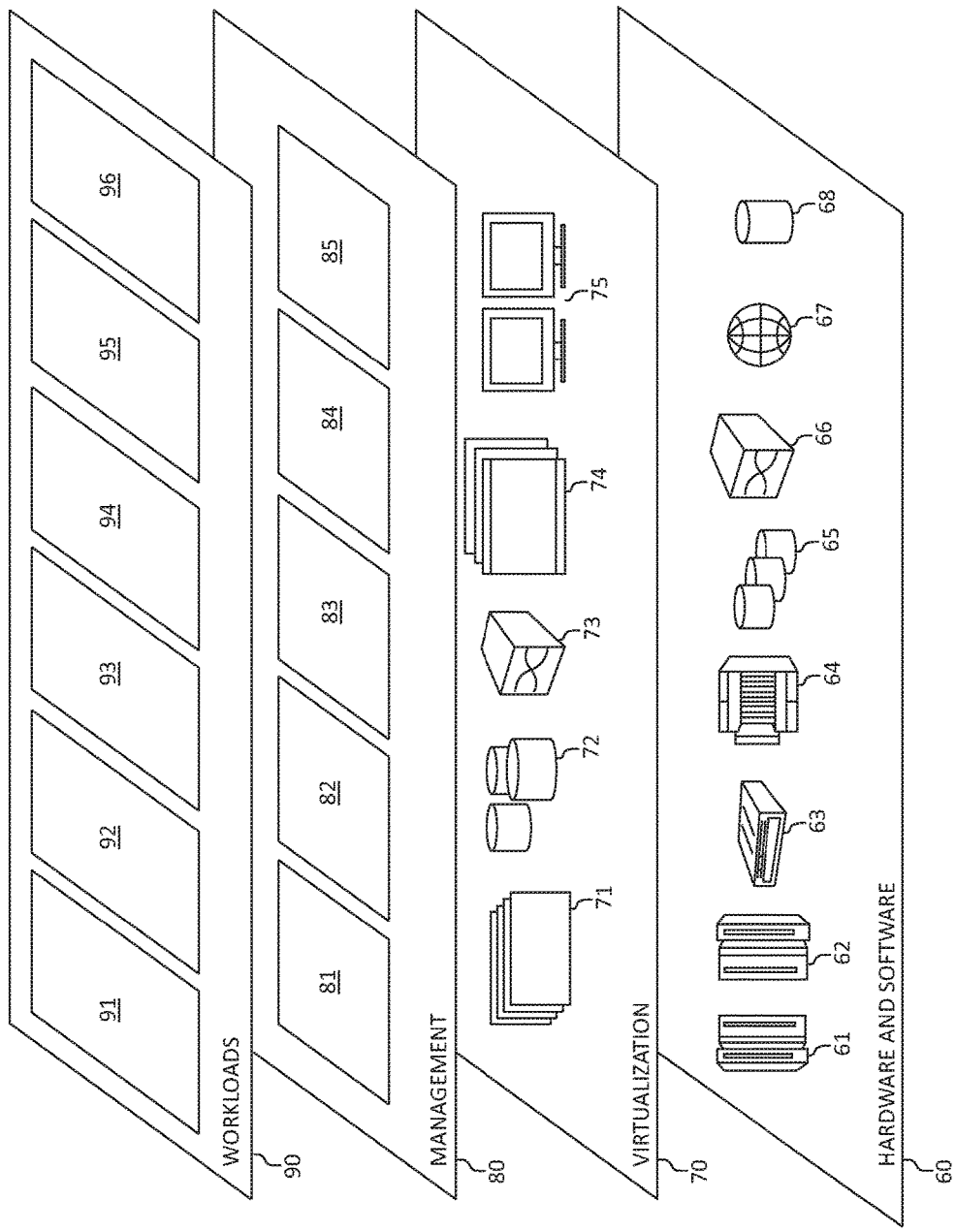
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various communication processing workloads and functions 96. In addition, communication processing workloads and functions 96 may include such operations as data analytics, data analysis, and as will be further described, notification functionality. One of ordinary skill in the art will appreciate that the communication processing workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the mechanisms of the illustrated embodiments provide novel approaches for the monitoring and dissemination of communications to safeguard a user against submitting communication that the user may later regret to have submitted. These mechanisms include functionality that interprets the content of a particular message in terms of identified contextual factors, verifies an "appropriateness" of the message, and alerts the author or others providing the message when the content of the post in a certain setting could have potentially negative implications.

These mechanisms may use, in one embodiment, several identified contextual factors such as the author's profile, the type of audience, time and location of posting, and the like. The appropriateness checking functionality may be made against multifaceted factors such as country-specific laws, organizational policies, ethical and emotional impacts, determined negativity, and the like.

In addition to the social attributes of all parties involved in the communication in question, the parties' influence (e.g., number of followers/social eminence), current employment, etc., may also be considered to determine if the particular communications may have a negative impact to the user. In the event of an alert notification provided to the user, the mechanisms of the illustrated embodiments may provide the rationale behind the alert, enabling the user to either cancel the alert and proceed, or alter the communications accordingly. Should the user elect to proceed, the mechanisms may then require the user to provide feedback (e.g., reason, percentage of applicability/accuracy, etc.), which may be provided to a learning mechanism of the illustrated embodiments to adjust internal rules to improve the accuracy and enhance performance of the overall system.

The mechanisms of the illustrated embodiments provide, where applicable, alert notifications when the issuing of communications (e.g., social media post) may have a potential negative impact to the user, or to another party, which may result in loss of income, employment, legal implications, social implications, and so forth. The mechanisms are, among other aspects, rules driven, the development of these rules based on interpretation of the text of particular communication. In one embodiment, the rules may be adjusted towards sentiment analysis (e.g., opinion/negativity/emotional state/etc. of a particular communication) based on jurisdictional-specific rules or laws, geographic location, topic/thread, or other factors. A variety of cognitive, interpretive analysis in the context of a given communication may be utilized. Additionally, the mechanisms of the illustrated embodiments may consider still other factors such as social attributes/influence of all parties involved that may be used to determine the ultimate impact of a particular post in a social network, for example.

In view of the foregoing, the mechanisms of the illustrated embodiments provide, among other aspects, a cognitive mechanism to analyze and interpret the legal, ethical, moral, and courteous aspects of communication to determine "appropriateness" in the given context as determined by social profile information and other sources in a user's social network. In addition, the mechanisms provide a methodology for integrating the author-audience profiles and the type of communication and topic of communication collectively. As another aspect, the mechanisms provide a representational scheme for context specific rules that verify the appropriateness of the communication, as well as a methodology to collect potential feedback/reaction to the communication to modify the applicable analytical policies or rules.

Further, the mechanisms of the illustrated embodiments implement a machine learning/rule learning system which, based on the particular feedback/reaction, infers new contextual rules or adjusts the priority of existing rules, for example. Finally, the mechanisms may implement an optional warning generator, or auto-censoring functionality based on the results of the analysis.

By use of the mechanisms of the illustrated embodiments, the user is then able to make informed decisions about certain communications, for example in situations where the user may be unsure of particular societal mores, legal implications, or other knowledge that any user could not possibly be aware of in an increasingly globalized society. If the communications pass muster, the user may also then have the reassurance that they are submitting the communications in a safe and acceptable manner. Finally, the mechanisms of the illustrated embodiments may collect feedback based on various reactions to messages (from a potential host of other users) to provide a learning mechanism to adjust rules, derive new rules, or otherwise tweak settings for an improved result over time.

Figure 4:
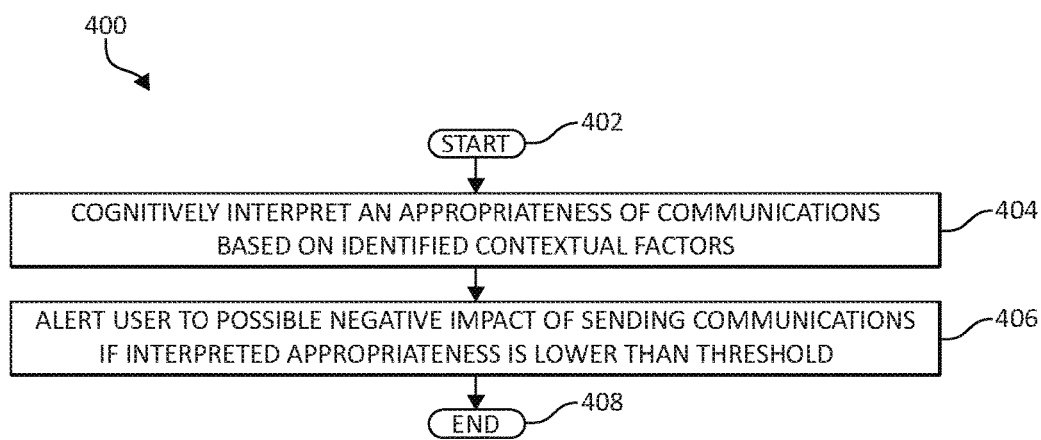
FIG. 4 is a flowchart diagram depicting an exemplary method for facilitating communications, in which various aspects of the present invention may be realized.

Turning now to FIG. 4, a flowchart of an exemplary method for facilitating communications by a processor is depicted, in which various aspects of the present invention may be implemented. Method 400 begins (step 402) by cognitively interpreting an appropriateness of communications based on identified contextual factors (step 404). If the interpreted appropriateness is lower than a predetermined threshold, then the user is alerted to the possible negative implications of sending or posting the communications (step 406). The method then ends (step 408).

Figure 5:
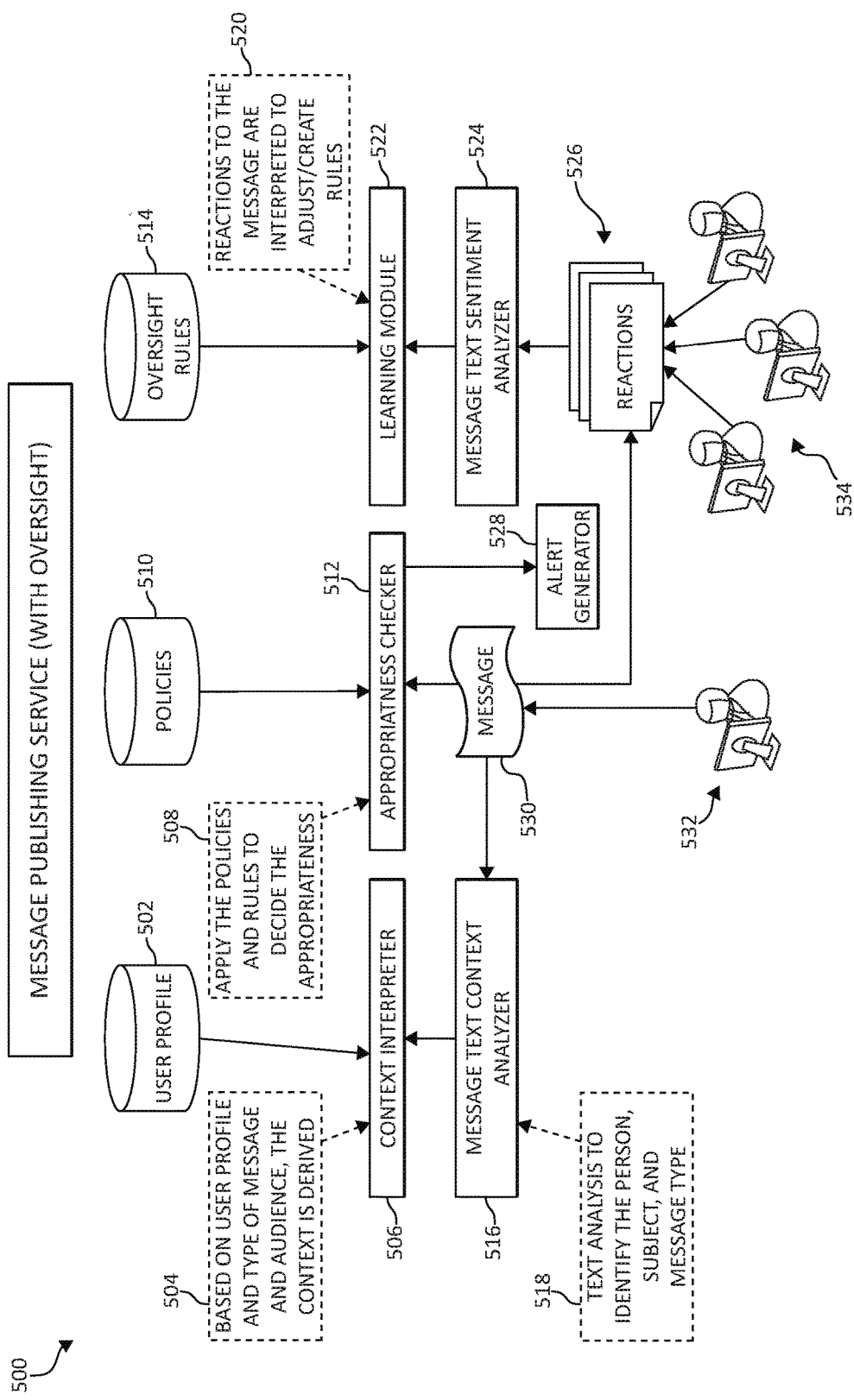
FIG. 5 is a block/flow diagram illustrating certain aspects of functionality according to the present invention.

In view of the method 400 of FIG. 4, consider, as an illustration of exemplary functional blocks to accomplish various purposes of the present invention, FIG. 5, following. FIG. 5 illustrates these exemplary functional blocks 500 and associated notes on specific functionality (as denoted by the doted boxes). Each of the functional blocks 500 may be implemented in hardware and/or software, such as by the computer/server 12 (FIG. 1), and/or the workloads layer 90 (FIG. 3).

In the depicted embodiment, a user profile block 502 is stored in a database containing various information such as user biographical information, associates of the user (friends or employment relationships, for example), geographical location of the user, and a potential host of additional information. As one of ordinary skill in the art will appreciate, the various user profile information may be obtained from a wide variety of sources, be it a local source, profiles associated with a particular social media application, employment information, and the like. Accordingly, these sources making up the user profile 502 may be spread throughout the Internet as part of a distributed computing and/or cloud environment as may other portions of the blocks 500 of functionality. Based on the user profile and the type of communication and audience, for example, the various contextual factors may then be identified and/or derived (shown by box 504).

A context interpreter 506 function is shown receiving information from a message text context analyzer 516. The message text context analyzer 516, among other functionality, uses text analysis of the communications in question to identify the person, subject, message type, or other information pertinent to the analysis in a particular situation. As shown the information from the user profile 502, as well as data from the message text context analyzer 516 is given to the context interpreter 506, which in turn provides information to the appropriateness checker 512.

In view of the functionality of the appropriateness checker 512, a variety of factors should be considered to evaluate the "appropriateness," such as, and not limited to, (1) the author's relationship to the topic/subject (e.g., a specific employee talking about a company product, a father creating a caption or comment on his daughter's photo, a political leader talking about his rival party, and so forth), (2) the platform where the message is posted (audience) or, for example, relationship to the media or listeners, (3) the time and place information, (4) policies and laws applicable (such as employment policies, laws applicable to a certain geographical location, or other applicable standards), and (5) offensive communication that may be considered by the system to never be appropriate at any time or place, irrespective of the user's role, position, etc. As shown in database block 510, these aforementioned policies, and other related information may be provided from a variety of sources (local, government, media, search engines, and a host of other sources, for example) to the appropriateness checker block 512.

The user 532 provides the communication to be analyzed (here message 530) to the appropriateness checker 512, which examines the communication in view of all of the information gathered through the previously described blocks 502, 506, and 516. Message 530 may include social media posts, or a reply to an existing thread, for example. The appropriateness checker then applies the policies and rules in view of the identified contextual factors to determine the particular appropriateness, which is then compared against a predetermined threshold for acceptable appropriateness.

If the calculated appropriateness is less than the threshold value, the alert generator block 528 then functions to notify the user. The alert generator 528 may utilize one or more specific rules to generate one or more rationales for the alert, so that the user may make an informed decision. The alert generator 528 sends the notification to the user and manages the response. If the user decides to continue with the communication, the alert generator will obtain feedback from the user. The user then provides feedback as previously described, which may be combined with other user feedback of the communications (or similar communications) from users 534 to form reactions 526.

The reactions 526 is then provided to a message text sentiment analyzer block 524, which then analyzes the sentiment context from the various reactions 526, and provides this information to the learning module 522. The learning module implements a machine learning mechanism as previously described, where reactions to the communication are interpreted to adjust or derive new rules (shown by box 520). In one embodiment, the learning module 522 is a contextual appropriateness rule learning engine, which may infer new rules or update the priorities of existing rules. Techniques such as sequential covering or decision tree learning, or neural networks (as one of ordinary skill in the art will appreciate) may be used to infer new rules or reinforce priorities of existing rules. The interpretations are then provided to the oversight rules database block 514, which is then fed back to the appropriateness checker 512 as shown.

In view of the foregoing blocks of functionality 500, the following specific examples of functionality may be implemented. First, the relationship between the subject and object and the topic (e.g., employee-company product, competitor-rival behavior, parent-child's photo, citizen-judge, citizen-leader, leader-foreign policy, journalist-incident) may be identified. The profile(s) of the author of the communication may then undergo analysis. Based on the initial analysis, various relationships may be identified. Some relationships allow all types of comments/opinions for example. Other relationships may allow certain types of comments, some relationships may allow for certain comments on specific platforms/media, while some relationships are completely inappropriate for any communication in any media.

The particular relationship between the sender, recipient, the broader audience and the topic of the message, and the nature (e.g., tone, sentiment, etc.) of the message/comment—negative/positive, factual, judgmental, accusing, defamatory, controversial, unwarranted, (typical sentiment analysis) may be identified. As a next step, the type of media/audience, such as public media, private emails, inside organization forum, and other relationships may be identified. These relationships may be partially or wholly identified from a study of the user's profile. The appropriateness may then be verified using country-specific, organization-specific rules, general policy rules, social etiquettes rules, which take into consideration the relationships and factors previously identified. The appropriateness is then verified using other context specific rules. The sum total of the foregoing analysis is then compared against the aforementioned threshold and an alert notification is given where warranted. Feedback is collected and searched from the user and others' reactions, and sentiment analysis is performed on the collected feedback. The applicable rules are then adjusted, or new rules are derived, based upon the collected feedback.

The exemplary context-specific rules may be, in one embodiment represented as <author> <sentiment of remark> <object of remark> NOT APPROPRIATE for <target audience> if <conditions (location, time . . . )>. Here, identification or interpretation of the <author> using his/her profile is dependent on the <target audience> and the <object/subject of remark>. For example, if the <subject of remark> is a person, the relationship between the <author> and the <subject> becomes important. It may be friend, colleague, teacher, close relatives such as <father/mother/son/daughter/spouse>, or public figures such as <actor/leader/politician>, etc.

In one embodiment, a methodology for weighting certain contextual factors, or the determination of whether the particular communication being analyzed exceeds a threshold for inappropriateness may be represented as <author> <sentiment of remark> <object of remark> NOT APPROPRIATE for <target audience> if <aggregate of intensity levels> exceed <set limit for intensity level total>. For example, if the methodology weights certain kinds of communications differently as between different corresponding intensity levels (each having a corresponding weighted value), aggregating the sum total of the communication as a whole, and comparing against a preset limit the sum total of weighted communications, if the methodology finds that the aggregate sum total is greater than the preset limit, the system may notify the user that their communication is potentially inappropriate/offensive given the context.

If, for example, the communications concern a product of a company, the relationship between the author to the <company> is to be interpreted by the system. The relationship may be the company where he/she is employed, investor, customer, public media (may be all of the foregoing), author's company's competitor, supplier, partner, etc. Similarly, the relationship between the <author> and <target audience> may be interpreted. This also may be friend, family, colleagues, fellow professionals, public, etc. The sentiment of the communications may be interpreted to be positive (appreciative), negative (accusations, defaming, allegations, complaint), sarcasm, tones of racism, sexism, blasphemy, and so forth.

In one embodiment, the last component to be analyzed is the logistical context of the remark, or, for example, where the remark is made in private one to one communications (emails/text messages), one to many but limited circle (friends circle, restricted forums, group emails, closed meetings, selected investors, conference calls), or open communications (social media, open blogs, social network broadcasts, public web sites, public platforms, press/media conferences, newspapers/magazines, etc.).

Once the relationships between <topic> <subject> <object> <sender> <recipient> <audience> are identified in the context, a set of rules can be applied to verify the "appropriateness" of the message. Some example rules are as given below:

<adverse remarks> of <own company products> NOT APPROPRIATE in <public forums>

<adverse remarks> of <own company products> NOT APPROPRIATE in the presence of <competitor representatives>

<adverse remarks> of <own company products> NOT APPROPRIATE in the presence of <customer representatives>

<adverse remarks> of <own company products> NOT APPROPRIATE in the presence of <media representatives>

<adverse remarks> of <own company products> NOT APPROPRIATE in the presence of <investor representatives>

<adverse remarks of own company> NOT APPROPRIATE in <public forums>

<adverse remarks of own company> NOT APPROPRIATE in the presence of <competitor representatives>

<adverse remarks of own company> NOT APPROPRIATE in the presence of <customer representatives>

<adverse remarks of own company> NOT APPROPRIATE in the presence of <media representatives>

<adverse remarks of own company> NOT APPROPRIATE in the presence of <investor representatives>

<positive/supporting remarks of competitor/competitive products> NOT APPROPRIATE in <public forums>

<positive/supporting remarks of own company> NOT APPROPRIATE in the presence of <customer representatives>

<positive/supporting remarks of own company> NOT APPROPRIATE in the presence of <media representatives>

<adverse remarks of local rulers/government> NOT APPROPRIATE in <public forums> if <country=C5, C9, or C33>

<positive/supporting remarks of own company> NOT APPROPRIATE in the presence of <media representatives> if <country=C5, C9, or C33>

Figure 6:
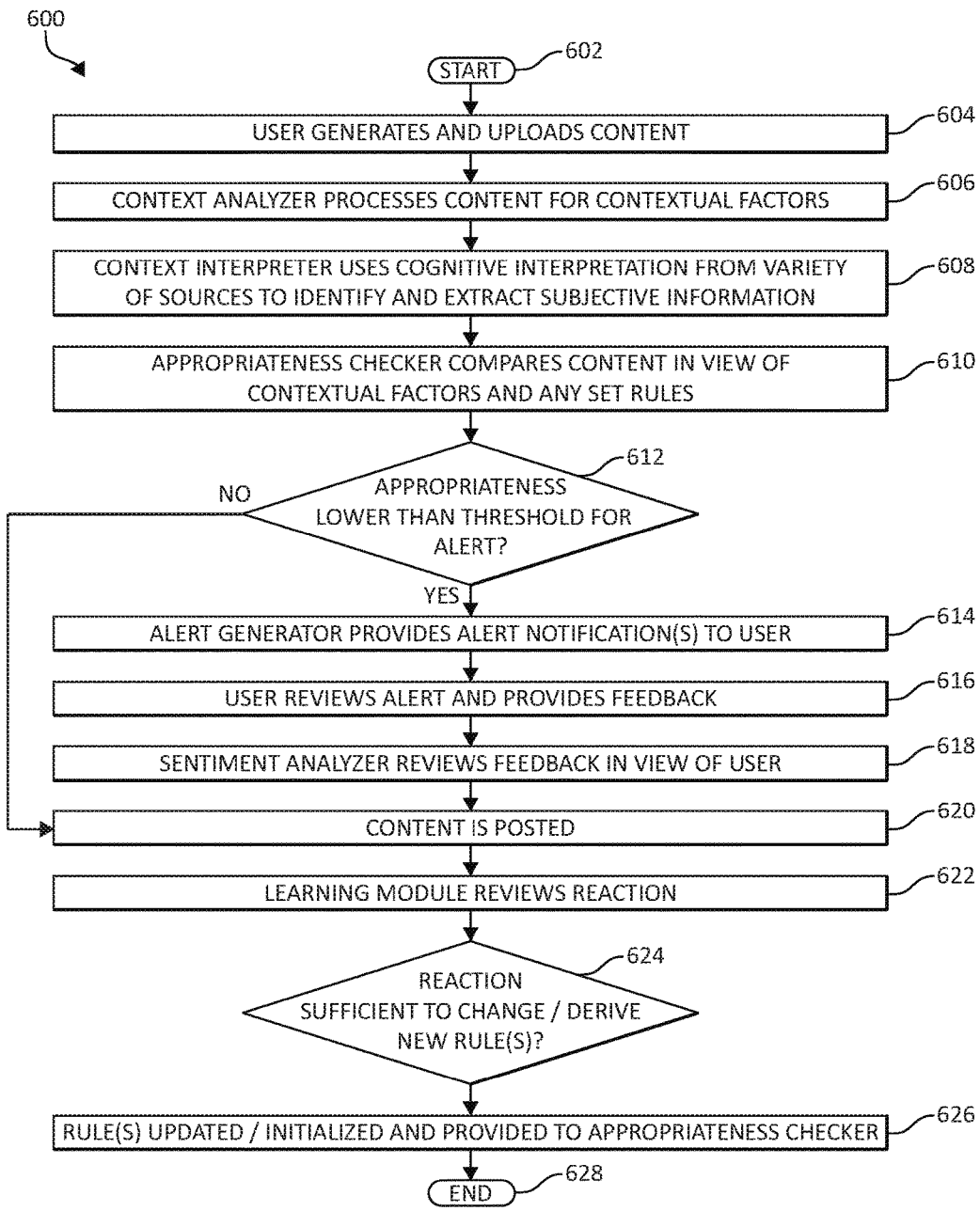
FIG. 6 is an additional flowchart diagram depicting an additional exemplary method for facilitating communications, again in which various aspects of the present invention may be realized.

Turning now to FIG. 6, an additional flowchart showing an additional exemplary method 600 for facilitating communication is depicted, here again in which various aspects of the present invention may be realized. As one of ordinary skill in the art will appreciate, the various steps depicted in method 600 may be completed in an order or version differing from the depicted embodiment to suit a particular scenario.

Method 600 begins (step 602) with the generation and uploading of content for analysis (step 604). The context analyzer processes the content for contextual factors (step 606). The context interpreter then uses cognitive interpretation from various sources to identify and extract subjective information (step 608).

In step 610, following, the appropriateness checker compares the uploaded content in view of the identified contextual factors and any set rules, and computes the overall "appropriateness" of the subject communication (among other considerations). If the appropriateness is less than the predetermined threshold (i.e., greater than that required to be a candidate for alert), then the alert generator provides the alert notifications to the user in step 614. The user reviews the alert and either accepts the recommendation, and/or provides feedback to the system (step 616). The sentiment analyzer reviews the feedback in view of the user in the subsequent step 618, and the content is posted (step 620). The learning module reviews the feedback along with other user reaction in step 622. If the reaction is deemed sufficient to change/derive new rule(s) in decision step 624, the applicable rule(s) are updated/initialized and provided to the appropriateness checker (step 626). The method 600 then ends (step 628).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for facilitating communications of a user by a processor, comprising:
    cognitively interpreting an appropriateness of the communications based on a plurality of identified contextual factors prior to the user sending the communications to another party;
    alerting the user to a possible negative impact of sending the communications to the other party if the interpreted appropriateness is less than a predetermined threshold;
    implementing a series of rules for use of the communications based on the identified contextual factors; and
    collecting feedback information from the communications to modify the series of rules for use; wherein collecting the feedback information includes, subsequent to the user electing to proceed sending the communications upon receiving the alert, prompting the user to provide a percentage of applicability and an accuracy of the interpreted appropriateness of the communications.

2. The method of claim 1, wherein cognitively interpreting the appropriateness of the communications based on the plurality of identified contextual factors further includes interpreting legal, ethical, moral, or courteous ones of the contextual factors in view of the communications.

3. The method of claim 1, further including analyzing related communications to determine if an identified contextual factor in the related communications is similar to one of the identified contextual factors in the communications.

4. The method of claim 1, further including initializing a machine learning mechanism using the feedback information to infer a new one of the series of rules for use or reorder a priority of the series of rules for use.

5. The method of claim 1, further including initializing a warning generator to perform the alerting to the user or implement an auto-censor operation based on the interpreted appropriateness.

6. A system for facilitating communications of a user, comprising:
    a processor, operational within and between a distributed computing environment, that:
        cognitively interprets an appropriateness of the communications based on a plurality of identified contextual factors prior to the user sending the communications to another party,
        alerts the user to a possible negative impact of sending the communications to the other party if the interpreted appropriateness is less than a predetermined threshold,
        implements a series of rules for use of the communications based on the identified contextual factors, and
        collects feedback information from the communications to modify the series of rules for use; wherein collecting the feedback information includes, subsequent to the user electing to proceed sending the communications upon receiving the alert, prompting the user to provide a percentage of applicability and an accuracy of the interpreted appropriateness of the communications.

7. The system of claim 6, wherein the processor, pursuant to cognitively interpreting the appropriateness of the communications based on the plurality of identified contextual factors, interprets legal, ethical, moral, or courteous ones of the contextual factors in view of the communications.

8. The system of claim 6, wherein the processor analyzes related communications to determine if an identified contextual factor in the related communications is similar to one of the identified contextual factors in the communications.

9. The system of claim 6, wherein the processor initializes a machine learning mechanism using the feedback information to infer a new one of the series of rules for use or reorder a priority of the series of rules for use.

10. The system of claim 6, wherein the processor initializes a warning generator to perform the alerting to the user or implement an auto-censor operation based on the interpreted appropriateness.

11. A computer program product for facilitating communications of a user by a processor, the computer program product comprising a non-transitory computer-readable storage medium having computer-readable program code portions stored therein, the computer-readable program code portions comprising:
    an executable portion that cognitively interprets an appropriateness of the communications based on a plurality of identified contextual factors prior to the user sending the communications to another party;
    an executable portion that alerts the user to a possible negative impact of sending the communications to the other party if the interpreted appropriateness is less than a predetermined threshold;
    an executable portion that implements a series of rules for use of the communications based on the identified contextual factors; and
    an executable portion that collects feedback information from the communications to modify the series of rules for use; wherein collecting the feedback information includes, subsequent to the user electing to proceed sending the communications upon receiving the alert, prompting the user to provide a percentage of applicability and an accuracy of the interpreted appropriateness of the communications.

12. The computer program product of claim 11, further including an executable portion that, pursuant to cognitively interpreting the appropriateness of the communications based on the plurality of identified contextual factors, interprets legal, ethical, moral, or courteous ones of the contextual factors in view of the communications.

13. The computer program product of claim 11, further including an executable portion that analyzes related communications to determine if an identified contextual factor in the related communications is similar to one of the identified contextual factors in the communications.

14. The computer program product of claim 11, further including an executable portion that initializes a machine learning mechanism using the feedback information to infer a new one of the series of rules for use or reorder a priority of the series of rules for use.

15. The computer program product of claim 11, further including an executable portion that initializes a warning generator to perform the alerting to the user or implement an auto-censor operation based on the interpreted appropriateness.

\* \* \* \* \*